C. R. WARD

3,155,480

APPARATUS FOR DRAWING GLASS

Filed Dec. 13, 1960

INVENTOR.
CECIL R. WARD
BY
Oscar L. Spencer
ATTORNEY

Nov. 3, 1964  C. R. WARD  3,155,480
APPARATUS FOR DRAWING GLASS
Filed Dec. 13, 1960  7 Sheets-Sheet 7

INVENTOR.
CECIL R WARD
BY
Oscar L Spencer
ATTORNEY

United States Patent Office 3,155,480
Patented Nov. 3, 1964

3,155,480
APPARATUS FOR DRAWING GLASS
Cecil R. Ward, Gibsonia, Pa., assignor to Pittsburgh Plate Glass Company, Pittsburgh, Pa., a corporation of Pennsylvania
Filed Dec. 13, 1960, Ser. No. 75,507
4 Claims. (Cl. 65—85)

This invention relates to the manufacture of sheet glass by continuous drawing from a bath of molten glass and provides improved methods and apparatus for producing drawn sheet glass of improved appearance wherein the usual characteristic wave pattern, i.e., transverse thickness variations which appear as bands of ribs, extending generally in the direction of the draw, is eliminated or materially reduced.

These characteristic wave patterns primarily occur because of non-uniform cooling of the sheet across its width. To provide uniform cooling of the sheet, it is desirable to allow the heat loss to take place substantially entirely by radiation rather than by a transfer to convection currents or a combination of radiation and a transfer to convection currents.

In conventional processes of drawing sheet glass, a natural stack is induced by the geometry of the sheet, bath and drawing chamber wherein there is a transfer of heat from the bath and sheet at relatively elevated temperatures to the cooler ambient air within the chamber producing a convection flow of air in the direction of the draw and out of the chamber. The movement of the heated air in the direction of the draw results in zones of reduced pressure at the base or meniscus of the sheet, so that colder air is drawn to the reduced pressure zones. Air enters the drawing chamber at the juncture of the chamber and the drawing machine and leaks into the chamber from cracks, crevices, or the like in the chamber walls. Colder air flowing to the zones of low pressure is chilled by moving generally across coolers, which are disposed within the chamber slightly above the surface of the bath and on the opposite sides of the sheet to accelerate the setting of the glass. As readily understood, the temperature of entering air will be non-uniform because of differences in temperature of the sources of this air and this condition will persist due to differences in paths taken by this air in the drawing chamber and, also, due to conditions within the kiln. These temperature differences cause non-uniform velocities within the drawing chamber. The colder air of non-uniform velocities flows to the reduced pressure zones and disturbs the relatively thin surface adhering film moving with the glass causing non-uniform heat transfer across the sheet, thereby affecting the formation of the glass in the area where the glass undergoes the transition from fluid to solid state. Being in the plastic state and under stress, the glass is unequally attenuated to form a characteristic longitudinal wave pattern.

Another characteristic wave pattern extends diagonally and usually exists on the outer margins of the sheet. This diagonal wave pattern may be so severe, in some instances, as to extend entirely across the sheet. The diagonal wave pattern, when superimposed on a longitudinal wave pattern provides a pattern referred to in the sheet glass industry as "batter" or "dapple," and is the result of currents of colder air flowing from the vicinity of the ends of the coolers and the ends of the drawing chamber to the zones of low pressure at the base of the sheet. These currents of air are commonly referred to as "end-around currents."

Many arrangements have been proposed to improve the appearance of drawn sheet glass. One such arrangement is taught by Brichard in United States Patent No. 2,693,052 wherein burners or suction means are disposed just above the surface of the bath to eliminate flow of relatively cold air to the base of the glass sheet and to eliminate flow of air along the sheet in the direction of the draw. Thus, either no air flow takes place along the sheet or else such air flow as takes place moves along the sheet in a direction opposite to that of the draw.

It has been found that the appearance of drawn sheet glass may be materially improved if, instead of eliminating the flow of air to the base of the sheet, the flow of air to and from the base of the sheet is controlled or regulated, so as to be diminished but not eliminated. This control or regulation of the flow of air to the base of the sheet does not eliminate but reduces the flow of air along the sheet in the direction of the draw. The latter flow of air forms an undisrupted unidirectional protective layer or envelope surrounding the sheet and moving at a velocity sufficiently low so that it does not disturb the relatively thin insulating surface adhering film of air surrounding the sheet. This reduction of flow of air to and from the base of the sheet eliminates or materially reduces the non-uniform disturbance of the relatively thin surface adhering film of air surrounding the sheet, so that variations in attenuation of the sheet are materially reduced, thus providing an improvement in the appearance of the sheet.

The provision of a protective envelope of air moving at a sufficiently low velocity in the direction of the draw results in a minimized cooling of the glass sheet by heat transfer through convection currents and thereby allows more uniform cooling of the sheet by radiation to the usual coolers spaced from the sheet and located slightly above the surface of the bath of molten glass. The end-around currents are also reduced and/or rendered ineffective, so that the usual diagonal wave pattern is eliminated. Thus, a method and apparatus have been devised for eliminating the undesirable effects of air currents which naturally occur in a sheet glass drawing device while retaining their desirable effects. Stated somewhat differently, a method and apparatus have been devised for reducing the flow of air to and from the base of a glass sheet being drawn to such a degree as to minimize undesirable effects, while retaining sufficient flow of air so as to form a protective envelope surrounding the sheet in the direction of the draw and obtain new desirable effects.

Briefly, the invention herein disclosed utilizes novel means to create a stack effect upon the air within the drawing chamber behind each cooling member, in this way counteracting the normal cyclic movement of cool air between the cooling members and the remote parts of the drawing chamber which would, if not diverted, cause an uneven cooling of the glass sheet in the critical forming zone.

Therefore, the primary object of this invention is the provision of improved methods and apparatus for improving the appearance of drawn sheet glass.

Another object of this invention is the provision of methods and apparatus for eliminating the undesirable effects which occur in a sheet glass drawing chamber because of the natural air currents while retaining the desirable effects of these air currents, thereby materially improving the appearance of the sheet being drawn.

A still further object of this invention is the provision of improved methods and apparatus for controlling and regulating air currents within drawing chambers without introducing additional gases into the chamber.

Other objects and features of this invention will be apparent from the following description and the appended drawings, which illustrate various embodiments of the invention and in which.

Turning to the drawings wherein like parts are identified with like reference characters, there is shown in each of FIGS. 1–6 a sheet of glass 10 being drawn from a bath 12 of molten glass in a drawing kiln generally indicated at 13 (only parts of which are shown but which is a conventional construction). A draw bar 14 extending transversely of the kiln 13 is submerged in bath 12. The glass sheet 10 in its viscous condition forms a base or meniscus 16 with the surface of the bath 12, and the sheet 10 is drawn from the bath 12 and through the drawing chamber 22 of a kiln 13 by means of drawing rolls 18 of a conventional drawing machine generally indicated at 20. The drawing chamber 22, as depicted in the drawings, is defined by bath 12 and conventional L-blocks 24, ventilator water coolers 26, end walls 28 and catch pans 30. The ventilator coolers 26 are each positioned between an L-block 24 and the base framework of the drawing machine 20 and extend substantially to the end walls 28 of the kiln 13. The base of the drawing machine 20 is substantially closed by means of the generally U-shaped catch pans 30, which are formed as coolers and are positioned so as to catch broken glass which may drop in the machine and thus prevent entry of fragments into the bath 12. These catch pans 30 also extend substantially to the end walls 28 of the kiln 13 and are constructed for the passage of cooling fluid, such as water. One leg of each catch pan 30 is disposed substantially parallel to and spaced from the sheet 10. Conventional water coolers 32 are provided for cooling sheet 10 by absorbing radiation from the sheet 10. The coolers 32 are spaced above the surface of the bath 12 and are positioned on opposite sides of the sheet 10 to extend substantially the width of the sheet.

So much of the apparatus as has been just described is common to the prior art and the instant invention, and constitutes a normal or usual sheet glass drawing apparatus setup.

Figure 2:
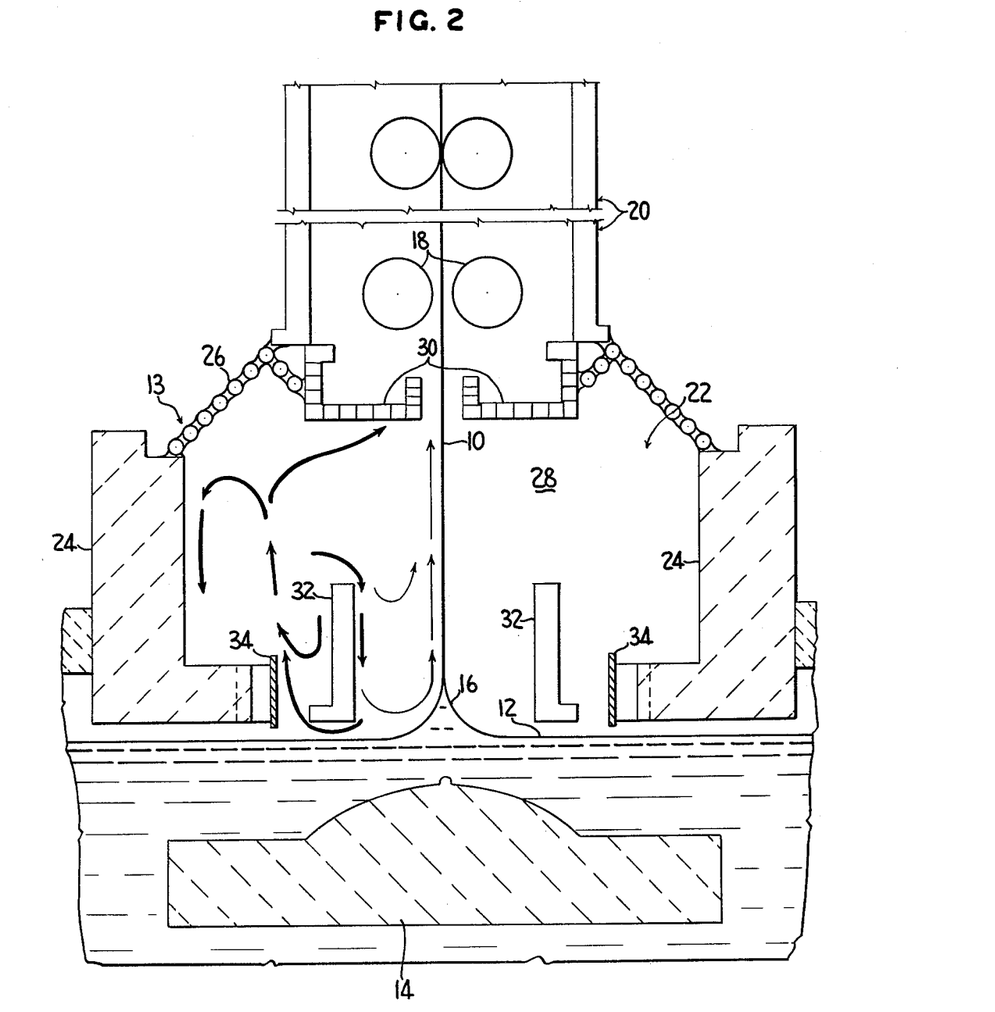
FIG. 2 shows diagrammatically a first embodiment of a drawing kiln according to this invention and the flow of principal air currents therein.

Reference is now made to FIG. 2 illustrating a basic preferred embodiment of this invention wherein, in addition to the conventional apparatus elements in their usual structural arrangement, there are planar members such as metal plates 34 positioned parallel to and extending substantially the width of the glass sheet 10. The plates 34 are positioned closely adjacent to the molten bath on each side of the glass sheet between the sheet and the L-blocks 24 and are mounted in this embodiment against the foot of each L-block, suitably supported through the end walls 28. Mounting details are more fully described in connection with FIG. 7. Each metal plate 34 is constructed of a steel alloy or other suitable material having a sufficiently high melting point to withstand the operating temperature of the kiln and having a sufficiently high thermal conductivity to assure the attainment of a substantially uniform temperature over its entire surface, even when heat is applied only at one edge of the plate. By virtue of the proximity of these plates to the molten bath, they will normally be heated well above the ambient temperature of the drawing chamber.

Figure 3:
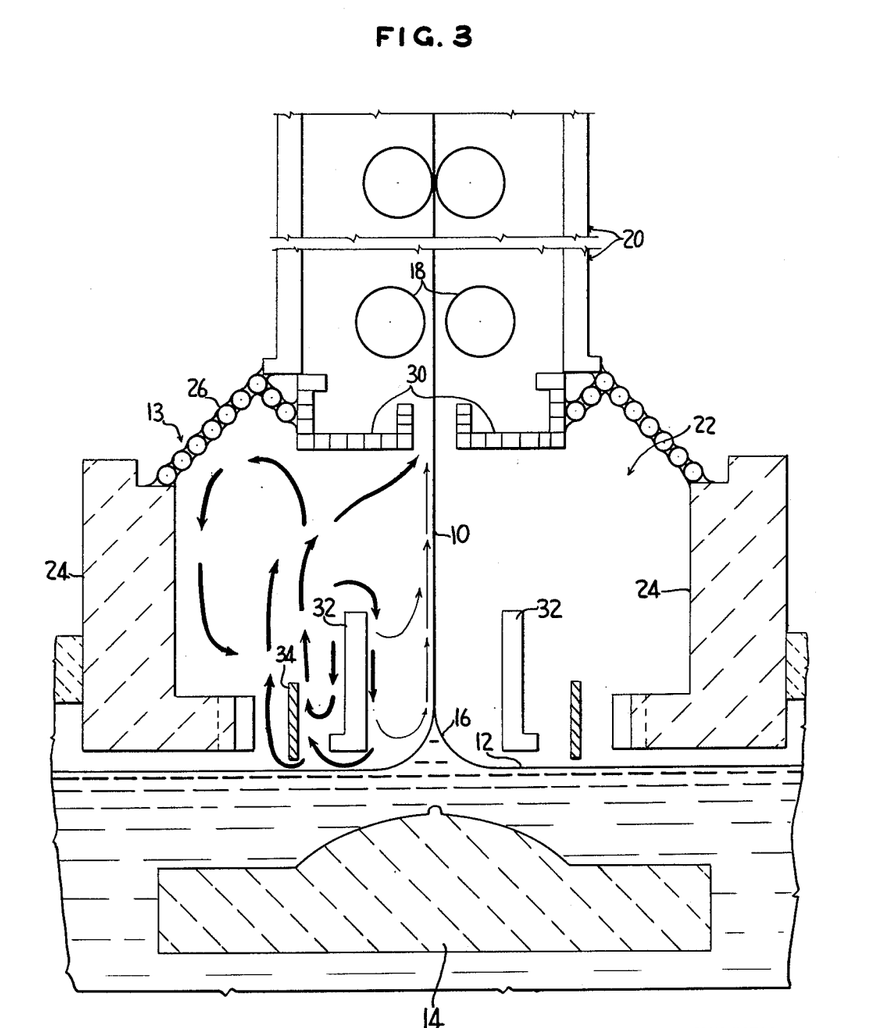
FIG. 3 shows diagrammatically a second embodiment of this invention and the flow of principal air currents therein.

FIG. 3 illustrates a second embodiment of the invention wherein the arrangement is similar to that illustrated in FIG. 2 except that the metal plates 34 have been spaced from the front face of the foot of each L-block. Mounting details are more fully described in connection with FIG. 7.

Figure 4:
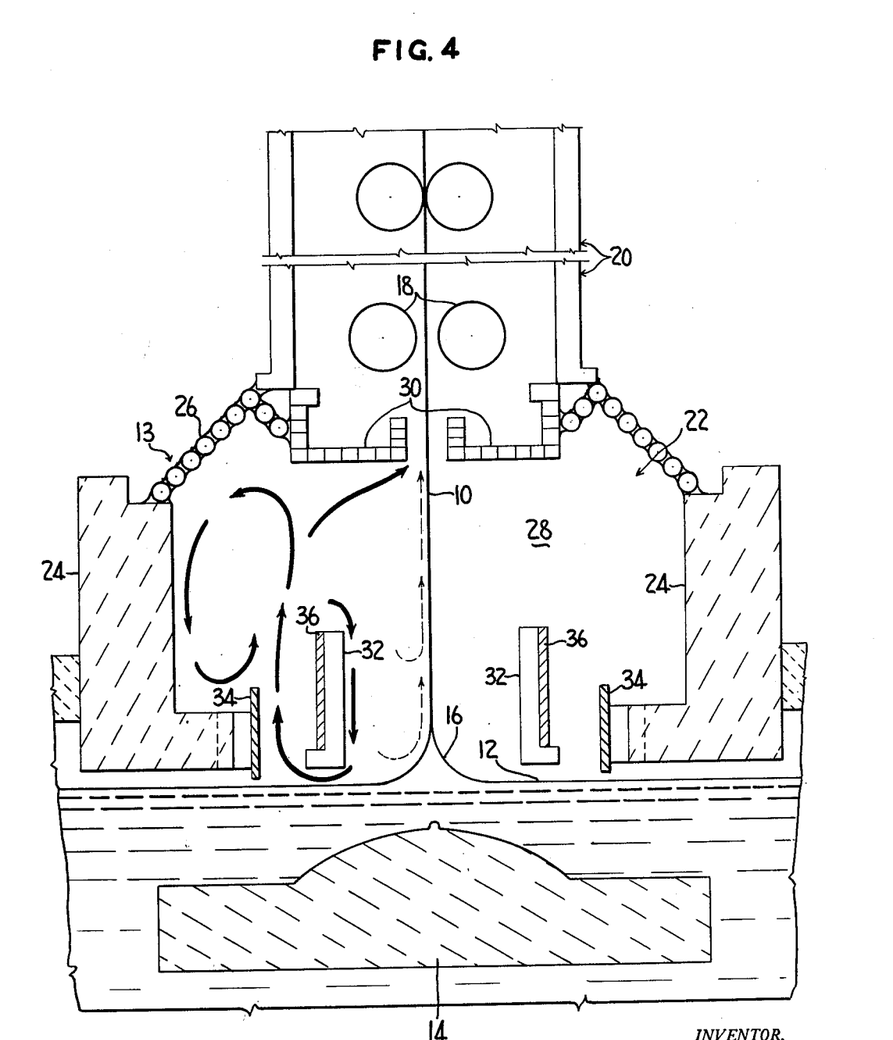
FIG. 4 shows diagrammatically a third embodiment of this invention and the flow of principal air currents therein.

FIG. 4 illustrates a third embodiment of the invention wherein the arrangement is similar to that illustrated in FIG. 2, except that a backing, such as sheet material 36, is fastened to the back surface of each cooling member 32. It is contemplated that such a backing could also be similarly used in conjunction with the arrangement shown in FIG. 3. This backing and the cooling members 32 will be described more fully in connection with FIG. 8.

Figure 5:
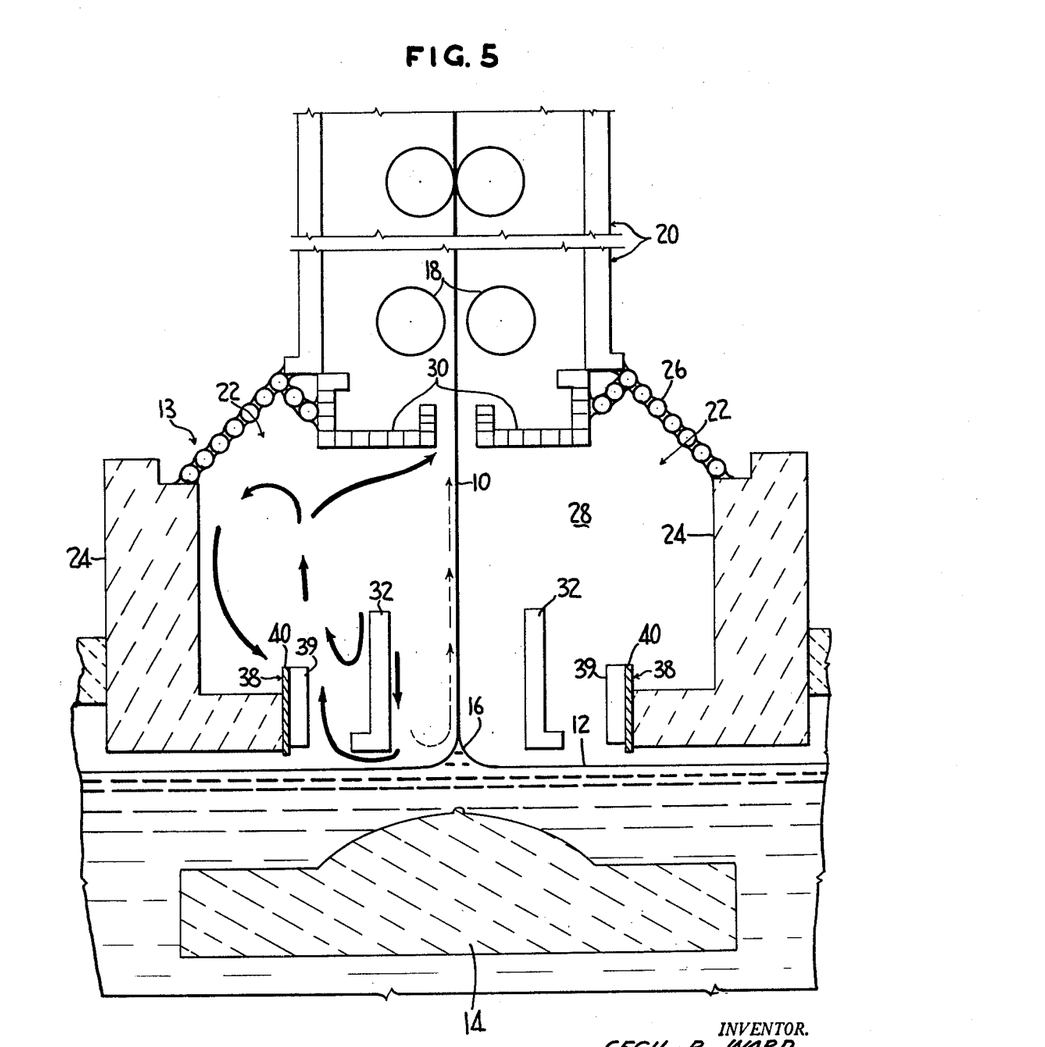
FIG. 5 shows diagrammatically a fourth embodiment of this invention and the flow of principal air currents therein.

FIG. 5 illustrates a fourth embodiment of the invention. The construction is identical to that of FIG. 2 except that plates 34 have been replaced with plates 38 having fins 39 fastened, as by welding, at substantially right angles to a backing plate 40 to increase the surface area. These finned plates are shown in more detail in FIG. 7.

Figure 6:
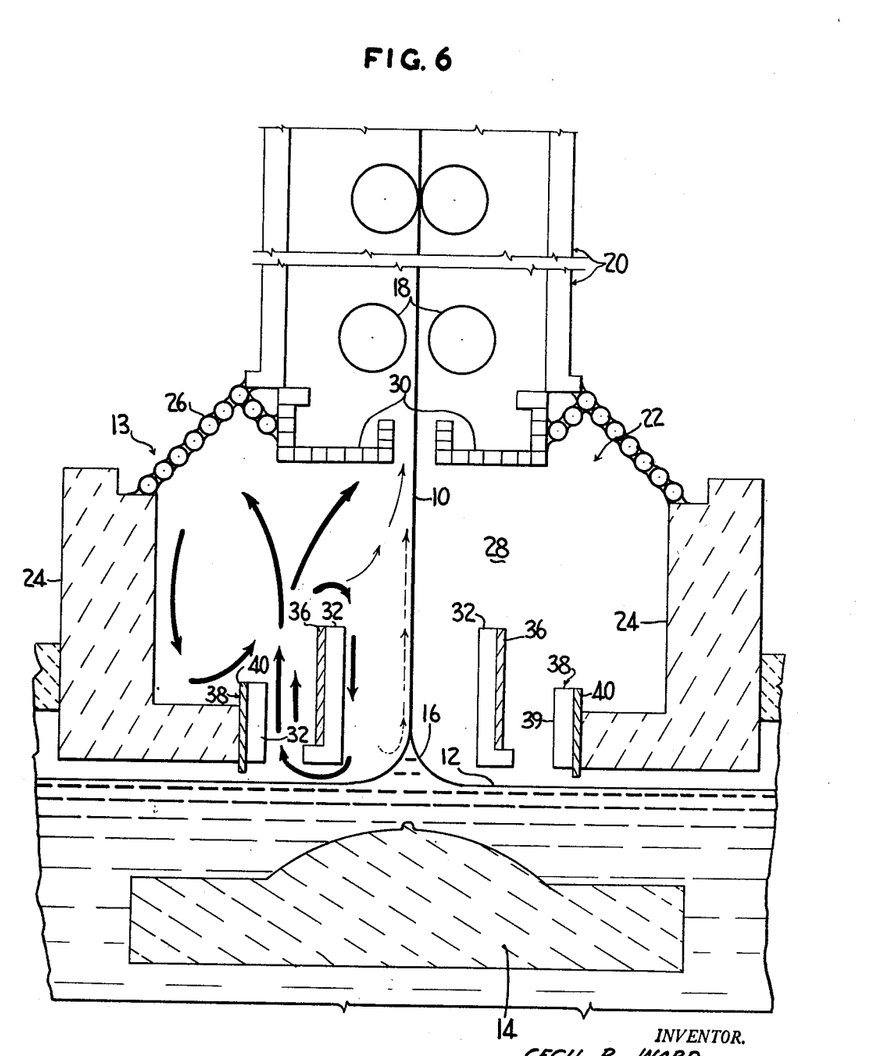
FIG. 6 shows diagrammatically a fifth embodiment of this invention and the flow of principal air currents therein.

FIG. 6 illustrates a fifth embodiment of the invention similar to that illustrated in FIG. 5 but with a backing, such as sheet material 36, provided on the coolers in a manner similar to that shown in FIG. 4.

Figure 7:
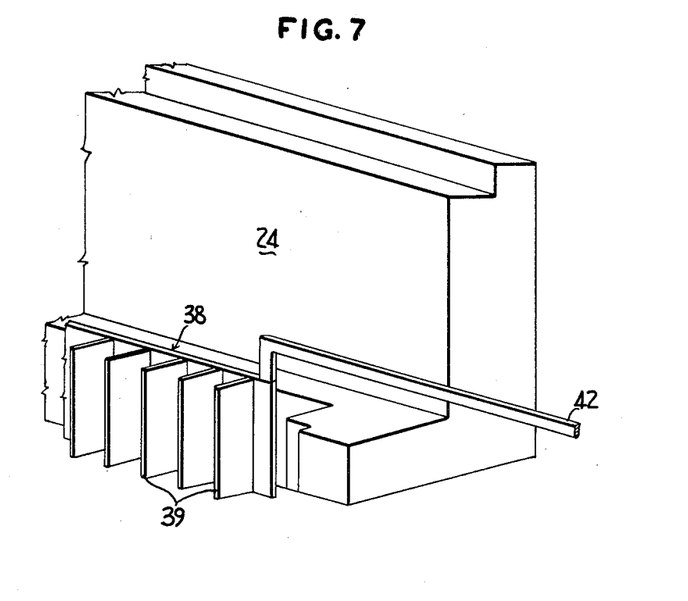
FIG. 7 is a partial, isometric view of the construction of a finned plate mounted against the foot of an L-block.

FIG. 7 illustrates constructional details of the finned plate 38 positioned transversely of the drawing chamber and mounted against the front face of the foot of an L-block so as to be located closely adjacent the bath of molten glass. Also illustrated are constructional details of one member 42 of a pair of mounting members for supporting the finned plates 38 as shown, or, in a similar manner, plates 34 (not shown) from outside each end wall 28. These mounting members may consist of a rod or pipe of a steel alloy or other material that will withstand the high operating temperatures of the drawing chamber and are suitably fastened, as by welding, to each end of the metal plates. The mounting members 42 normally extend through the end walls 28 of the drawing chamber and are suitably supported, as by brackets or other conventional means (not shown), outside the drawing chamber. In this manner each metal plate 34 or finned plate 38 may easily be positioned against the front face of an L-block or spaced therefrom, as desired.

Figure 8:
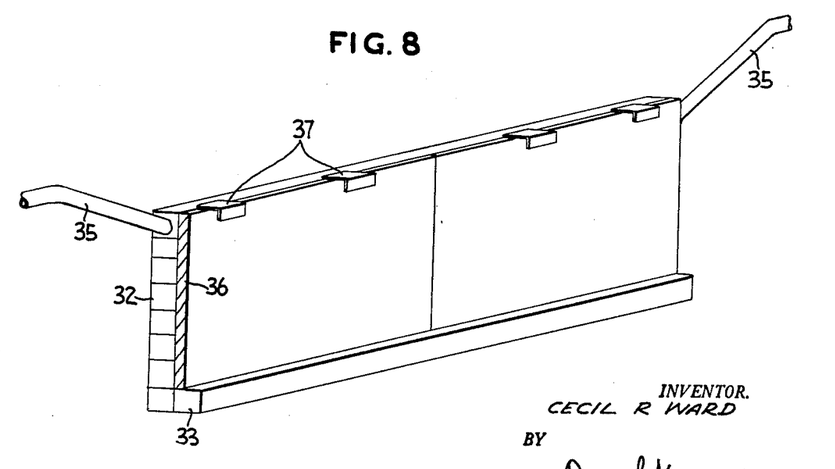
FIG. 8 is an isometric view of a cooling member with a sheet backing material mounted thereon.

FIG. 8 illustrates constructional details of one form of cooling member, including the mounting means for attaching a backing. The illustrated backing, in the form of a flat, pressed sheet of asbestos-type material 36, rests on a rearwardly extending foot portion 33 of each cooler 32, and is preferably fastened at the top of each cooler by angle brackets 37. These brackets are suitably fastened, as by welding, to the top of each cooler 32 to provide a channel which allows the backing material to be slid into place from either end of the cooler. The pipes 35 provide for continuous circulation of water through the cooling member, in a manner well known in the art.

In FIGS. 1–6, inclusive of the drawings, the directions of the principal air currents within the drawing chamber 22 are shown by arrows for the left-hand portion of chamber 22. It is not necessary to show the principal air currents to the right of sheet 10 because they are mirror images of those shown. Relatively high, intermediate, and relatively low velocity air currents are shown in heavy solid, light solid, and broken lines, respectively.

Figure 1:
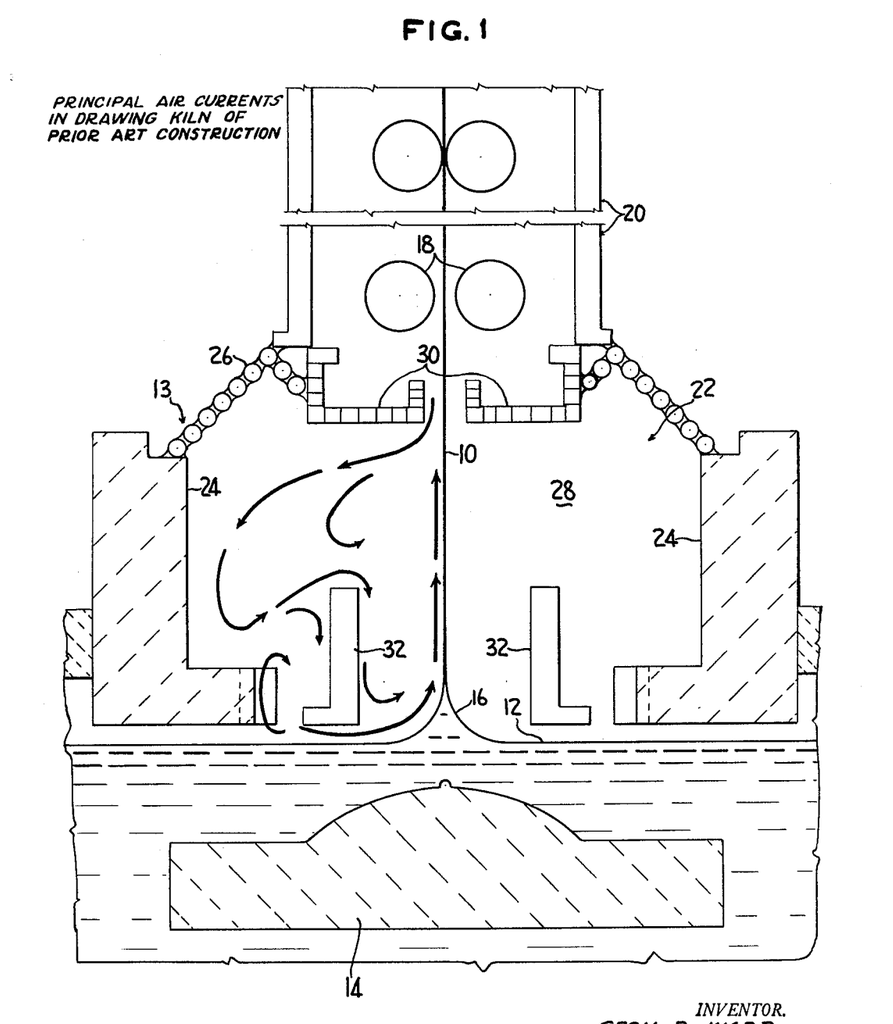
FIG. 1 shows diagrammatically a drawing kiln of conventional, prior art construction and the flow of principal air currents therein.

In FIG. 1, the principal air currents for the normal drawing kiln arrangements are illustrated. The temperature of glass sheet 10 in its travel through chamber 22 is substantially above the general air temperature within chamber 22, so that sheet 10 induces air to flow in the direction of its draw and along its faces. This air flow creates low pressure zones in the vicinity of each side of the base 16 of sheet 10. The currents of air along the faces of the sheet are those which form the natural stack effect. This layer of air along the sheet moves at a substantially greater velocity than the sheet. To supply this stack flow of air there must be a supply of air flowing to the low pressure zones. A primary source of this air is the drawing machine. That air enters a chamber 22 between sheet 10 and catch pans 30 at a temperature below that of sheet 10 and flows past the catch pans 30, which are constructed as coolers, the ventilator coolers 26 and the L-blocks 24 between the end walls 28, all at a relatively low temperature, so that a zone on each side of sheet 10 and generally bounded by catch pan cooler 30, ventilator cooler 26, L-block 24 and walls 28 becomes a secondary source of colder air. The temperature in this secondary zone will vary transversely thereof, being lower adjacent the end walls 28, so that air in different portions in this zone will also vary in temperature. Air from this zone flows to the low pressure zone at the base 16 on each side of sheet 10. The colder air from the secondary source flows downwardly and across the faces of coolers 32, being further chilled, and into the low pressure zone at the base of sheet 10, thereby providing a relatively large quantity of colder air and, more importantly, moving at relatively high velocities of different magnitudes to the low pressure zone. This colder air of different temperatures and velocities transversely of chamber 22 disturbs non-uniformly the air traveling with the sheet, resulting in the formation of the usual characteristic longitudinal wave pattern extending in the direction of the draw. End-around currents of colder air also flow to the low pressure zones at the base 16 of sheet 10 and disturb the air flowing with the sheet in the direction of the draw, thus resulting in the diagonal wave pattern.

In accordance with the present invention (referring to FIGS. 2 and 3 which show arrangements utilizing only the planar members positioned at or near the foot of each L-block) plates of a material having high thermal conductivity, such as a steel alloy which will withstand the high operating temperatures of the drawing chamber, are supported against the front face of the foot of each L-block or, as shown in FIG. 3, are spaced therefrom and located between the foot of each L-block and the respective cooling member. By virtue of the proximity of these plates to the molten bath and the high conductivity of the material from which they are formed, the plates absorb radiant energy from the bath and attain a substantially uniform elevated temperature over their entire area. Having attained such an elevated temperature, the plates transfer heat to the adjacent air behind each cooling member and thereby create a stack of rising warmer air in the area behind each cooler. This results in a low pressure zone adjacent each metal plate and causes air from the vicinity of coolers 32, including that which may cascade downwardly across the front face (facing the plane of draw) and which would then normally flow to the base 16 to be drawn underneath and behind the coolers away from the base and into the cyclic path of movement of air within the zone of the secondary source of cold air. Since the air flowing toward base 16 of sheet 10 is thereby materially reduced, the effects of its non-uniformity in velocities and temperature does not disturb the relatively thin surface adhering film of air adjacent the sheet. Because this flow of air to the base 16 of the sheet 10 is not entirely eliminated, air still flows in the direction of the draw as the protective envelope. However, some of this air has been diverted into the cyclic path of movement of the air in the zone of the secondary source and is rendered ineffective to disturb the film of air adjacent the sheet 10.

As far as the end-around currents are concerned, these are drawn into the cyclic path of movement of the air in the zone of the secondary source and are rendered substantially ineffective to disturb the relatively thin surface adhering film of air adjacent the sheet. The overall effect is the elimination or material reduction in intensity of the usual wave patterns.

It should be emphasized at this point that in the absence of a metal plate or other planar member having a low thermal gradient, the previously exposed foot of the L-block would not provide a heat transfer source of constant high temperature over any extended portion due to its inherently low thermal conductivity. Therefore, the L-block by itself could not create a stack effect with the accompanying low pressure area adjacent the foot portion thereof so as to divert the normal flow of air. It should also be emphasized that the use of a planar member having the characteristics described herein not only materially reduces the intensity of the usual wave patterns in a novel manner, but also it accomplishes this result without introducing to the drawing chamber additional heat or gases and thus without requiring a source of fuel gas or pressurized air.

The stack of rising air induced by the plates 34 is intensified when the plates are spaced from the L-blocks, as shown in FIG. 3. Each plate now transfers heat to the adjacent air between the plate and the respective cooling member, and also radiates to the front surface of the foot of the L-block from which it is spaced. Normally, of course, the L-block is ineffective to create a stack effect on the adjacent air because its low thermal conductivity prevents it from attaining a uniformly elevated temperature over its entire surface and thus prevents it from conducting heat from the bath and transferring heat to the surrounding air. However, with a metal plate spaced from the foot of the L-block, heat from the bath is radiated by the plate uniformly over the entire front surface of the foot of the L-block. The front face of the foot of the L-block now becomes heated to a substantially uniform temperature elevated above that of the ambient air, and in turn transfers heat to the adjacent air to enhance the effect of the metal plate.

Looking now to FIG. 4, a backing, such as a sheet of insulating material, is secured to the back surface (facing away from the plane of draw) of each cooler in a suitable manner previously explained in conjunction with FIG. 7. This backing not only prevents the air behind the coolers from contacting the surface thereof being cooled, and then flowing down to the base of the sheet; but it also, and more importantly, absorbs radiant energy emanating from the molten bath 12 and from the adjacent heated metal plate 34 and becomes, in effect, a localized source of heat, which heat is transferred to the adjacent air by conduction. Due to the location and vertically planar configuration of the backing, it is ideally suited to create a strong upwardly directed stack of hot air behind the entire area of each cooler. It can be seen from the arrows in FIG. 4 that the combination of the metal plate and the backing material on the cooler have created a strong stack of rising air behind each cooling member in the same direction as the normal stack adjacent the glass sheets being drawn, but this stack is of course displaced from the normal stack so as to counteract the cyclical movement of air from the secondary source of cold air which normally moves toward the base 16 to supply the normal stack adjacent the sheet.

In FIG. 5, there is shown an arrangement similar to that of FIG. 2 but with a modified heat source 38, including additional surface area, as previously described. The fins 39 provide a greatly increased surface area from which the plate may transfer heat to the surrounding air at a substantially higher rate than without the fins. Since the ability of the metal to conduct heat is so great as compared with the surrounding air, the plate is still able to maintain a low thermal gradient notwithstanding the additional surface area and increased heat transfer. It is also contemplated that other configurations which increase the surface area while conforming in general to a planar configuration, such as a wavy plate, might also be used.

The embodiment of FIG. 6 includes the finned metal plates 38 and a sheet material backing 36 on each cooler. Since the effect of the increased area provided by the finned plate and the effect of the backing on each cooling member are cumulative, an extremely strong stack of rising air is created in the area behind each cooling member. This stack effectively diverts and controls the cooler air currents within the drawing chamber in the manner previously described so as to allow an even rate of cooling of the sheet of glass substantially entirely by radiation, thereby virtually eliminating the undesirable wave pattern customarily found in drawn glass.

Not only has an effective means for controlling the air currents within a drawing chamber been disclosed, but in addition, the instant invention provides a device which removes the necessity of an outside source of material, such as heated gas or fuel to affect this control; which introduces no foreign substances into the drawing chamber; and which, when once installed, requires no further adjustment during operation. It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:

1. An apparatus for drawing sheet glass from a molten bath of glass comprising
   a drawing chamber positioned above a molten bath of glass,
   said drawing chamber being at least partially defined by a pair of refractory members on each side of the plane of the draw of the glass through said chamber,
   a cooling member within the drawing chamber on each side of the plane of the draw for withdrawing heat from said chamber, and
   a member positioned in said drawing chamber immediately above the surface of said molten bath of glass on each side of and coextensive with the plane of the draw and between a cooler and the adjacent wall of the drawing chamber for collecting radiant heat from said molten bath of glass, and retaining said heat in said drawing chamber,
   said member being composed of a material of high thermal capacity and being of a size sufficient for said member to become heated to a temperature above the ambient temperature in said chamber,
   said member being spaced a substantial distance from both the adjacent wall of the drawing chamber and the adjacent cooler.

2. An apparatus as set forth in claim 1 wherein each of said radiant heat collecting members is a metal plate.

3. An apparatus as set forth in claim 1 wherein said pair of refractory members defining said drawing chamber are L-blocks, each having a foot portion extending toward the adjacent cooler and each of said radiant heat collecting members is a metal plate positioned adjacent said foot portion.

4. An apparatus as set forth in claim 3 wherein each of said radiant heat collecting members is a metal plate positioned adjacent said foot portion and having a broad side surface opposed to the adjacent cooler, each of said metal plates having a plurality of fins secured thereto on said side surface.

References Cited in the file of this patent

UNITED STATES PATENTS

| | | |
|---|---|---|
| 1,556,726 | Slingluff | Oct. 13, 1925 |
| 2,352,539 | Halbach et al. | June 27, 1944 |
| 2,952,097 | Atkeson | Sept. 13, 1944 |
| 2,991,590 | Brichard | July 11, 1961 |
| 3,097,942 | James et al. | July 16, 1963 |